United States Patent [19]
Wellner

[11] Patent Number: 5,640,193
[45] Date of Patent: Jun. 17, 1997

[54] MULTIMEDIA SERVICE ACCESS BY READING MARKS ON AN OBJECT

[75] Inventor: Pierre David Wellner, Middletown, N.J.

[73] Assignee: Lucent Technologies Inc., Murray Hill, N.J.

[21] Appl. No.: 290,663

[22] Filed: Aug. 15, 1994

[51] Int. Cl.⁶ .................................................. H04N 7/173
[52] U.S. Cl. .................. 348/7; 348/12; 348/13; 348/10; 455/5.1; 455/6.3; 455/6.2
[58] Field of Search ............... 348/6, 7, 12, 13, 348/8, 14, 15, 16, 17; 455/5.1, 4.2, 6.3; 340/825.1; 235/472, 375, 376, 378, 379, 380, 381, 383; H04N 7/16, 7/173, 7/14, 7/15

[56] References Cited

U.S. PATENT DOCUMENTS

| | | | |
|---|---|---|---|
| 3,668,312 | 6/1972 | Yamamoto et al. | 178/6.8 |
| 4,621,259 | 11/1986 | Schepers et al. | 340/707 |
| 4,816,904 | 3/1989 | McKenna et al. | 348/13 |
| 4,841,132 | 6/1989 | Kajitani et al. | 235/472 |
| 4,926,255 | 5/1990 | Von Kohorn | 358/84 |
| 4,947,028 | 8/1990 | Gorog | 235/381 |
| 5,247,347 | 9/1993 | Litteral et al. | 348/7 |
| 5,287,181 | 2/1994 | Holman | 348/6 |
| 5,319,454 | 6/1994 | Schutte | 348/7 |
| 5,357,276 | 10/1994 | Banker et al. | 348/7 |
| 5,438,355 | 8/1995 | Palmer | 348/1 |
| 5,446,490 | 8/1995 | Blahut et al. | 348/12 |

*Primary Examiner*—John K. Peng
*Assistant Examiner*—Chris Grant
*Attorney, Agent, or Firm*—John A. Caccuro; Donald P. Dinella

[57] ABSTRACT

An apparatus and method enables a user to control the selection of electronic multimedia services to be provided to the user by one or more servers over a communication medium. The apparatus includes a scanner for reading marks on an object and for communicating a request signal, having an object code representing the read marks, to a user interface. The interface receives the request signal and transmits to the servers a request command including an interface identification code and the object code which is used to select the desired electronic multimedia service. The servers identify the selected electronic multimedia service using the object code. The interface then enables the selected electronic multimedia service transmitted from the servers to be received by the user's receiver.

25 Claims, 3 Drawing Sheets

MULTIMEDIA SERVICE ACCESS BY READING MARKS ON AN OBJECT

TECHNICAL FIELD

The invention relates generally to multimedia systems and, more specifically, to a method and apparatus for controlling access to multimedia services.

BACKGROUND OF THE INVENTION

Interactive electronic services, video-on-demand, and the "information superhighway" will provide access to thousands of movies, home shopping information, games, and other multimedia documents. A significant problem in using these systems is how to browse through the enormous choices to discover what is available, and to select items of interest. The conventional approaches to solving this problem are to use channel surfing, use advertisements on preview channels that act as entry points to other movies, and use hierarchical menus that users can navigate through with a remote control to make selections. These approaches do not scale up well to allow rapid browsing of the thousands of multimedia documents that will be available.

Interactive television (ITV) systems will be able to present the user with information displayed on the screen, much as PC user interfaces do today. These ITV systems will be limited, however, by the low resolution of NTSC screens, and the low resolution of pointing devices that are usable from across a room. When it comes to making rapid selections from a large number of choices, ITV systems are awkward and slow to use.

SUMMARY OF THE INVENTION

The invention provides an apparatus and method for enabling a user to control the selection of electronic services to be provided to the user by one or more servers over a communication medium. The apparatus includes a scanner means for reading marks on an object and for communicating a request signal, having an object code representing the read marks, to a user interface. The interface receives the request signal and transmits to the servers a request command including an interface identification code and the object code to select the desired electronic service. The apparatus then enables the selected electronic service transmitted from the servers to be received by the user's receiver. In one illustrative embodiment, the servers are multimedia servers and the electronic service is a multimedia program.

According to other aspects of the invention, the scanner means may communicate to the interface means over an infra-red link, a radio link, or over a wired connection. The scanner means may read marks such as bar codes, alphanumeric characters or Xerox glyphs. The interface means may be adapted to receive and transmit over a wire pair, cable, optical or radio communication medium.

DETAILED DESCRIPTION

The present invention recognizes that people are very skilled at browsing through paper catalogs, magazines and books by flipping through the pages and glancing at photographs and text. A collection of printed color photographs can be much easier and quicker to browse through than a set of NTSC images. Paper has a number of useful properties: it is easier and faster to read, mark, and manipulate; it is portable, familiar and easily distributed. Many electronic systems attempt to replace paper, but it can be better for them to work with paper, exploiting its advantages to provide better access to multimedia information.

For example, U.S. Pat. No. 4,947,028, issued to J. M. Gorog on Jun. 8, 1993, describes an automated order and payment system which uses a ScanFone (trademark of U.S. Order). The ScanFone is a telephone with an attached credit card reader, a small alphanumeric display, and a bar-code scanner. Customers can use this ScanFone to pay bills and order merchandise from catalogs by scanning bar codes. This is an electronically supported, paper catalog home shopping application. It is phone-based, however, and does not enable the delivery of multimedia signals over the established connection to a user's multimedia terminal (e.g., television).

Figure 1:
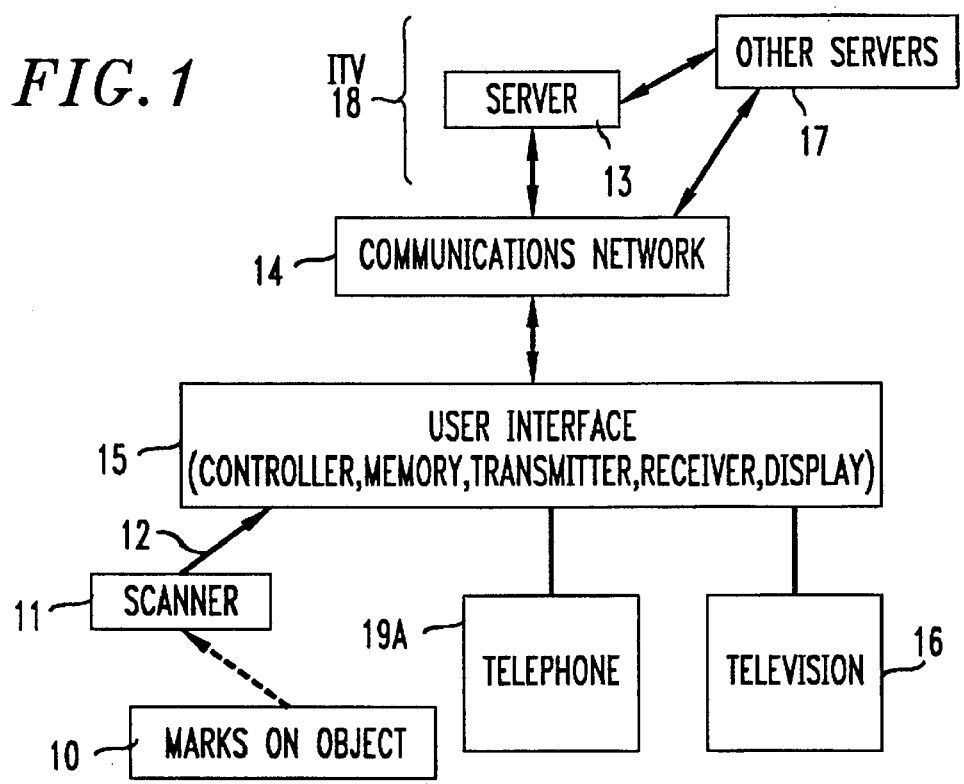
FIG. 1 shows an illustrative system incorporating the present invention.

As shown in FIG. 1, the system illustratively consists of one or more hand-held scanners or pens (11) that read marks (e.g., bar codes, alphanumeric characters, or Xerox glyphs) on the surface of an object. The object may be paper, plastic or other material. The object may also be mounted onto or be an integral part of an item as a means to identify that item.

For example, it is contemplated that each photograph or advertisement in a newspaper, magazine, or catalog can be accompanied by a printed bar code or alphanumeric ID. In order to retrieve the associated multimedia document, a user scans the printed ID with the scanner or pen (11), and the movie, product information, or game immediately starts to play. A variety of catalogs can be published (by the service provider or by third parties) catering to individual interests, e.g., old movies, horror films, or multi-user interactive games. Newspaper advertisements, magazines, books and pamphlets can also include these printed marks just as they now use phone numbers. Home shopping retailers can provide specialty catalogs. Distance learning applications can put printed marks into text books.

The scanner 11 communicates to the user interface unit 15 (e.g., a set-top box) through a cable, a wire pair (e.g., see scanner pen 11 and wire path 18), an infra-red link, or a radio link 12.

Figure 4:
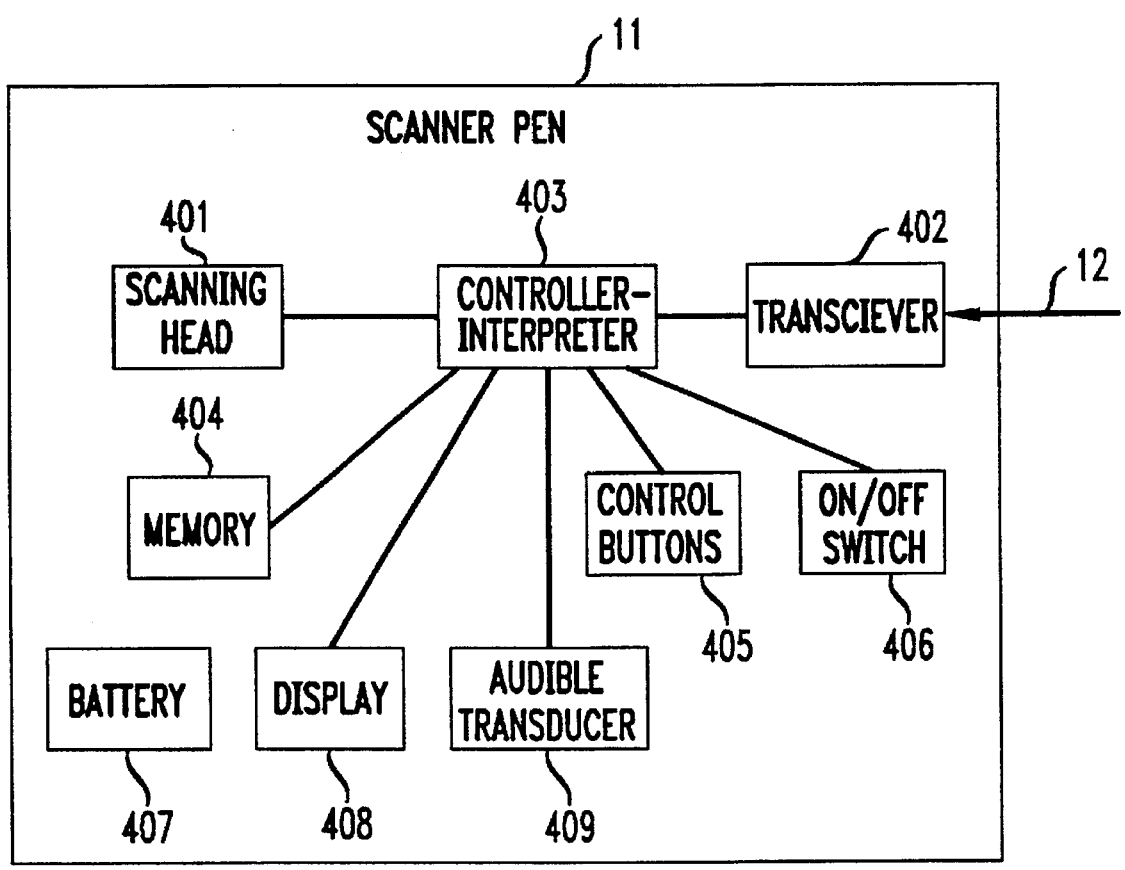
FIG. 4 shows an illustrative block diagram of a scanner pen in accordance with the present invention.

An illustrative scanner pen 11 is shown in FIG. 4 to include a scanning head 401 to read marks on the object being scanned. The transceiver 402 communicates the unprocessed output from scanning head 401 over radio link 12. Optionally, the scanner pen 11 may include a controller/interpreter which decodes the unprocessed output from scanning head 401 into a more compact or standardized code or format for communication over radio link 12. Switch 406 enables the user to turn on and turn off scanner pen 11 to conserve the battery 407.

According to another aspect of the invention, an optional memory 404 may be provided to enable the user to scan in at one time and transmit at a later time. The later transmission can be controlled by a transmit control button 405. An optional display 408 may provide visual feedback for communication to interface 15 or to display previously scanned marks in a human-readable format. A scan control button would enable a user to scroll through a plurality of previously scanned marks.

The memory may also store a scanner pen identification (ID) code to, for example, distinguish signals from different scanner pens which communicate with interface 15. Scanner pen ID codes could be used to uniquely identify the user, if each user has his/her own scanner pen. In interface 15, the controller can then compare the scanner ID code against a previously stored authorization table to determine if the user's request is authorized. For example, user requests which involve a charge for a particular service may only be authorized for a parent's scanner pen but not for a child's scanner pen. If authorized, the interface would include the scanner ID code as part of the scanner command sent to the servers 17. The scanner ID code may then be used by the servers 17 for the accounting or billing for services identified in the user request command.

An optional audible transducer may also be provided in scanner pen 11 to provide audible feedback to the user that a successful scan of the object has been performed and/or that the interface 15 has received the transmission from the scanner pen. Obviously, the interface 15 could also cause the display unit, e.g., television 16, to display a feedback audio or visual message to the user.

A scanner may be a separate pen or may be part of a remote control unit which provides remote control functions for the interface unit 15 and/or television 16.

The interface unit 15 includes means to provide audio and visual feedback to the user and means to transmit codes received from the scanner. The interface unit 15 transmits over communication network 14 to the head-end multimedia server 13. An optional telephone 19 which connects to interface unit 15 may be used to establish a connection to server 13. The interface unit 15 may be incorporated as part of a VCR or television receiver. In such an arrangement, the scanner 11 may include VCR or television remote control functions.

The communication network 14 may be provided by a cable TV company or telephone company or both and can use wire pair or coaxial cables, fiber optic cables, or wireless technology. Moreover, the interface unit (also referred to as an interface) 15 can also interface to, or be integrated with, a telephone set, a cable TV unit at the user location. The interface unit 15 and television 16 may together be implemented in a well-known manner using, for example, a multimedia computer including a controller, memory, transmitter and receiver units, display unit, etc., so as to implement the features described herein.

The multimedia server 13 may alone or together with one or more other servers 17 have access to or store large numbers of movies, movie previews, games, or any of the other well-known information that is electrically accessible by a user. The multimedia servers 13, 17 may provide a variety of multimedia services including prerecorded multimedia programs, instructional multimedia programs, and live multimedia programs. The multimedia service may illustratively include prerecorded video movie previews-on-demand, videos, games, etc. The multimedia services may also be live or prerecorded entertainment or sporting events, etc. The instructional multimedia service may, illustratively, be a maintenance program for a particular product, an assembly program for assembling a product, an educational tutorial, etc. The live multimedia program may, illustratively, include a live connection to a person or computer which may provide additional instructional information to the user. The user communicates with the person or interacts with the computer via telephone 19a.

While the present invention will be described as using multimedia servers 13, 17, it should be understood that the servers could, more generally, be used to provide audio programs, video programs or electronic documents to the user. Multimedia server 13 can handle service requests from thousands of customers at the same time. Once a user's input selection is processed, the server 13 sends multimedia data or programs down to the interface unit 15, which displays it on the user's television (TV) receiver 16.

The servers 13 and 17 may illustratively be part of one or more interactive television (ITV) networks 18, which may connect to communication network 14. The interactive television (ITV) network may, illustratively, be implemented as described in U.S. patent application Ser. No. 07/965,492 entitled "Interactive Television Converter" filed Oct. 23, 1992; U.S. patent application Ser. No. 07/997,985 entitled "Program Server For Interactive Television System" filed Dec. 28, 1992; U.S. patent application Ser. No. 08/056,973 entitled "Integrated Television Services System" filed May 3, 1993; and U.S. patent application Ser. No. 08/056,974 entitled "System For Composing Multimedia Signals For Interactive Television Services" filed May 3, 1993; all assigned to the assignee of the present invention and incorporated herein by reference as if set forth in their entirety. The ITV network 18 may be part of a larger global server network which may include video-on-demand servers, interactive TV servers, video telephone servers, broadcast TV servers, game servers, and user control panel servers.

Communication network 14 may include a national or international asynchronous transfer mode (ATM) network. In accordance with the present invention, a universal identifier is used to uniquely address every accessible electronic object on this network (sort of like a super phone number). One way to use scanner pen (hereinafter pen) 11 is in combination with marks 10 that represent a unique identifier code for electronic objects accessible on the ITV network 18. These codes could work in a similar way as the well-known Universal Resource Locator (URL) identifiers in NCSA Mosaic (Internet client access software for World Wide Web), only they would be read from paper (instead of typed into an application) or invisibly linked to on-screen buttons. Because of the enormous number of objects that can be accessed, these codes need to be large, and standard bar-codes would become too large to be placed unobtrusively in paper publications. For this application, Xerox glyphs are more appropriate, because they can encode a large amount of data in a short space.

Another possibility is for the scanner pen 11 to scan alphanumeric characters. These characters could specify a unique identifier for a multimedia program, or they could be plain text that relates to some multimedia documents stored in the ITV network 18. The servers 13, 17 could match this text to keywords that describe stored documents on the network using well-known information retrieval techniques. This would enable the servers to select the multimedia document(s) that best match the keywords that the user scans, and offer them for viewing. One example of how this might be useful is for retrieving video clips of news or sports stories printed in newspapers and magazines.

Depending on how much data is represented by the marks 10, it may be possible to access any electronic object on the ITV network 18 with a single swipe, or it may be necessary to make two or more swipes, first to identify a service and establish a connection to it, and then to identify a domain within that service, and finally to identify a specific electronic object controlled by that service.

Figure 2:
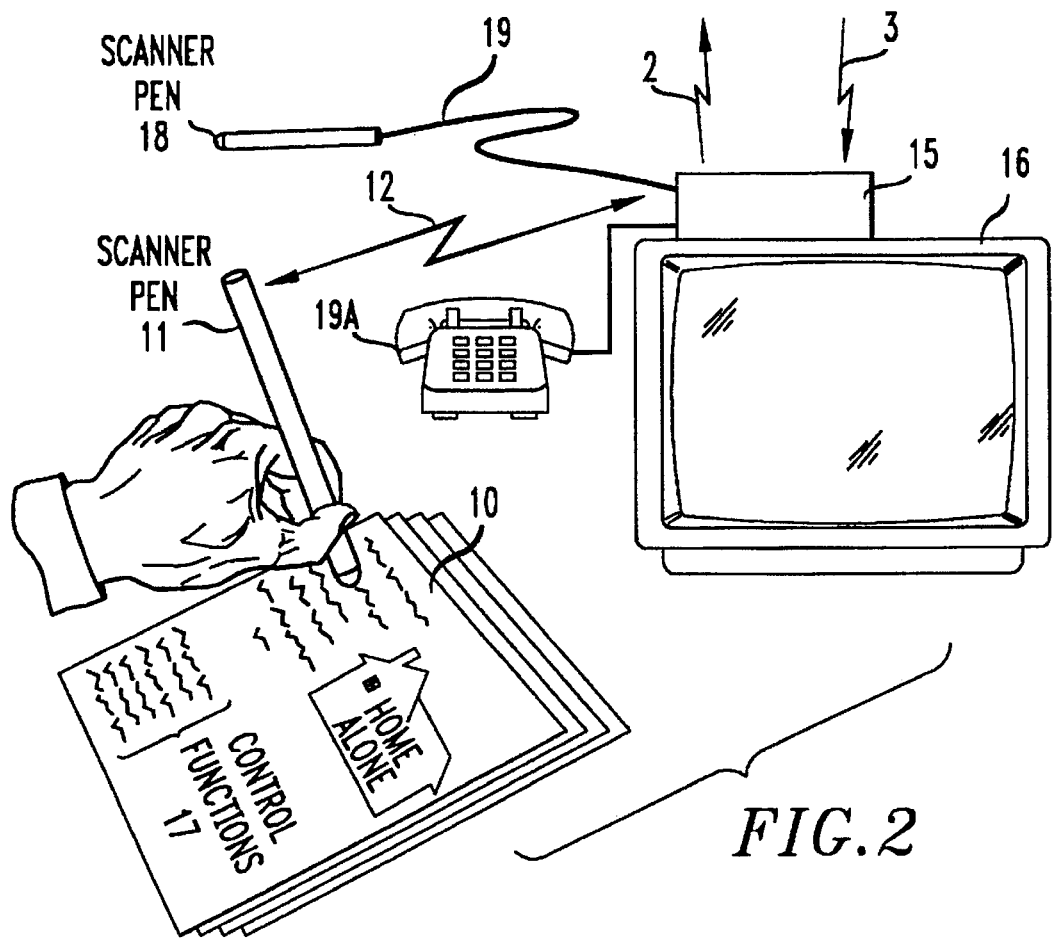
FIG. 2 illustrates how the system might be used.

FIG. 2 pictorially illustrates how one embodiment of the system might be used. In step 1, the user selects a film from a paper catalog and scans the identification (ID) marks next to the description of the film with the scanner pen 11. The pen 11 transmits scanned information from the paper to the interface unit 15 (also referred to as an interface). In step 2, the interface 15 interprets the information sent by the pen 11 and communicates with the multimedia server to request the movie that the user has selected. In step 3, the server transmits the film which begins to play on the TV monitor. Desirably, there should be almost no time lag between steps 2 and 3; but if there is a delay, then the multimedia server would output a message to the TV screen to indicate that the film is in the process of being retrieved.

Using this technique, a user may quickly browse through and preview dozens of movies or stored TV programs in a few minutes. To actually purchase a movie, the system may prompt the user, at the conclusion of a preview (or during a preview), and ask the user to signal his/her confirmation of the purchase by using one of the control buttons 405. Alternatively, predefined control marks, shown by 17 in FIG. 2, may be used to control various functions of the interface 15 and television 16. Illustratively, these control functions may include the standard type VCR control functions (start, stop, pause, etc.) as well as ordering functions (e.g., using an "order" mark). As shown in FIG. 2, a user can scan a predefined "order" mark to place his/her purchase order at any time during the preview. These predefined marks can be located on the same object (catalog, card, etc.) or on one or more menu cards.

Figure 3:
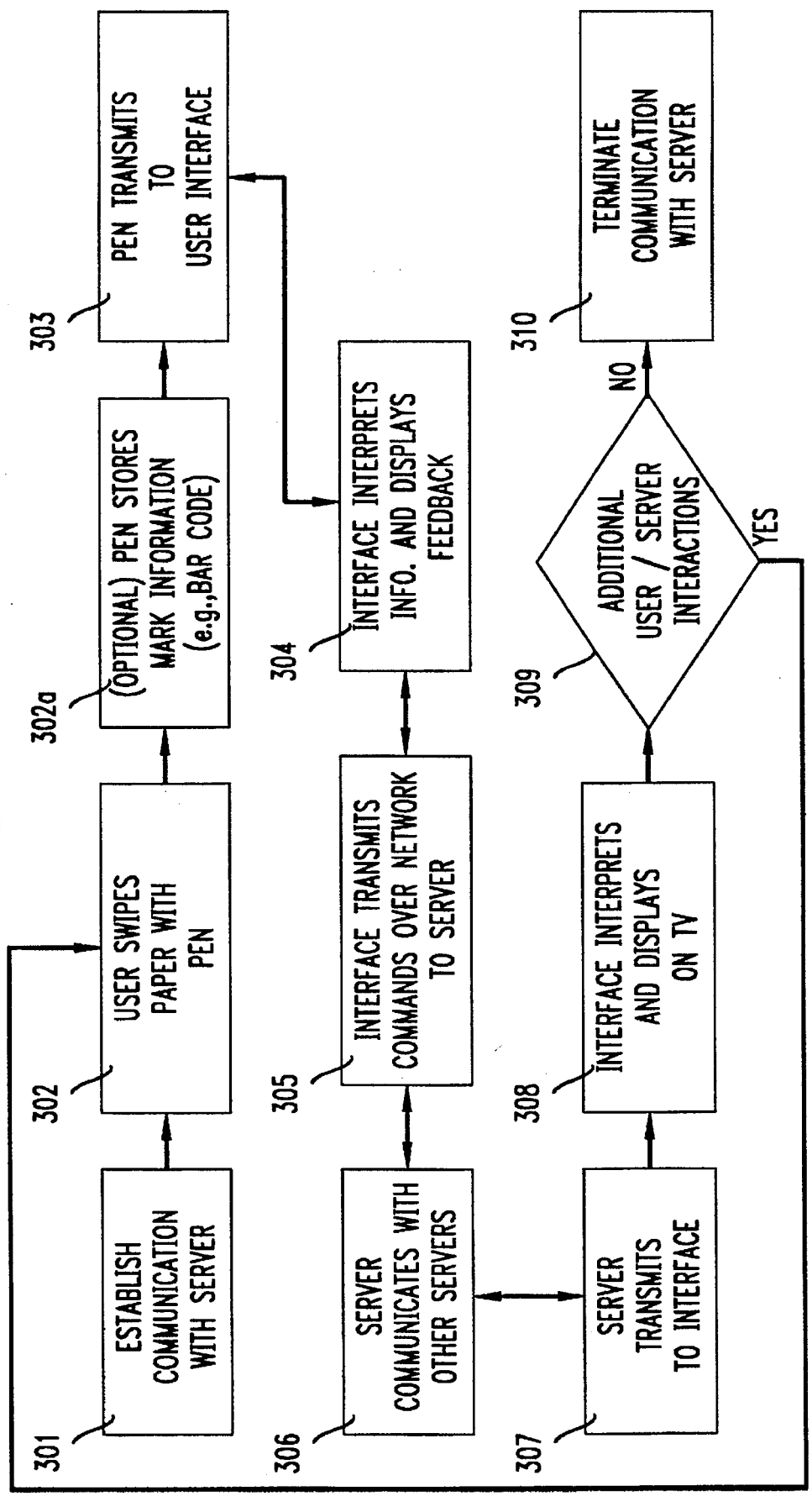
FIG. 3 is an illustrative flow chart describing the operations of the present invention.

FIG. 3 shows an illustrative flow chart of the steps involved in operating the present invention. In step 301, communication is established between the interface 15 and the server 13. This could be done by making a telephone call using telephone 19a or, if there is a full-time connection set up, by default, then only a few data packets need to be addressed from interface 15 to an appropriate server 13 via network 14. The initial selection of server 13 could be made using pen 11 to tell the interface 15 what server to address. In step 302, the user swipes the paper with the pen 11, which senses marks on the paper. In step 302a, the pen 11 may optionally store the mark information for later transmission to interface 15. In step 303, as previously described, these marks may be interpreted within the pen 11 before the information is transmitted to interface 15 or, to reduce the cost of the pen, the pen 11 may send raw scanning information to the interface 15 for processing. In step 304, interface 15 interprets the received information and may provide audio or visual feedback to the user. Interface 15 may also provide feedback to an audible transducer of pen 11 to indicate that it has received the scanning information. In step 305, the interface 15 communicates interpreted scanned data to a server via network 14, along with information that identifies itself and, optionally, pen 11. In step 306, the server 13 communicates with other servers 17 (e.g., billing servers, name servers, object database servers). In step 307, one of these servers begins to transmit electronic information to interface 15. The steps 303 through 307 may involve bidirectional communications. In the case of a movie, this information might be in the form of an MPEG data stream, which must be decompressed by interface 15, in step 308, before it can be displayed on the TV (or multimedia) receiver 16. In step 309, if there are additional user/server interactions performed, e.g., the ordering of a movie once a preview has been seen, control is returned to step 302. In step 302, the user would swipe across predesignated control function marks (e.g., an "order" mark) to perform the ordering function. These control functions can be initiated at any time by a user. In step 309, if no additional user/server interaction is necessary, then step 310 is performed. In step 310, communication is terminated between the server and the user in accordance with the user's desires, the end of the session, or other predefined criteria.

Other possible users of the present invention are identified below. Each of these applications makes use of the previously described basic hardware and the same basic processes. The differences are in what information is transmitted, and what the codes are printed on.

Product assembly and service instructions

A customer receives a lawn tractor, or complex piece of computer equipment, and each piece in the box is labeled with a bar code. When the customer scans these codes, video instructions instantly play to demonstrate how the part needs to be installed or serviced. It is no longer necessary to look through printed manuals to discover what a part is called and what to do with it. The objects themselves lead you through the process.

News magazines and newspaper access to TV footage

As subscribers read through a newspaper or magazine, they may be interested in seeing associated video footage. While reading the sports pages (e.g., *Sports Illustrated*), key events could be instantly recalled and played on demand, e.g., the moment an Olympic skier falls, the winning goal, etc. News stories can allow readers to instantly play interviews, sound bites, and crucial video footage of historical or current events.

Paper-based advertising linked to on-demand multimedia ads

Many of today's 800-number calls originate with a customer reading a paper advertisement in a newspaper or magazine or in direct mail ads. Multimedia ads may be the same. According to the present invention, people could instantly access multimedia presentations by swiping bar codes in the ads that catch their attention. These ads could lead to interactions with the company and to ordering. Merely the information that a person browsed through in the ad could be valuable for the company's future marketing efforts.

Courses and textbooks

Multimedia lectures could be tied to paper-based textbooks. Extensive reading is easier to do on paper, but animated video explanations and demonstrations are much more effective for some purposes. The two can be tied together by placing bar codes in the textbook that allow students to view parts of a lecture or specific demonstrations they are interested in. These bar codes could also link the textbook to live discussion groups with other students or to live interactions with professors and tutors.

What has been described is merely illustrative of the application of the principles of the present invention. Other arrangements and methods can be implemented by those skilled in the art without departing from the spirit and scope of the present invention.

I claim:

1. Apparatus for use with a multimedia server for enabling a user to control the selection of a multimedia service to be provided to the user by the multimedia server over a communication medium, comprising scanner means, operable by a user, for reading marks on an object to obtain information about the object itself, and for communicating to a user interface a request signal including an object code representing the read marks, said scanner means including means for storing the scanned marks and means, operable by a user, for controlling the communication of the object code to said interface; and said interface for interfacing the scanner means and a user display terminal to the communication medium, including receiver means for receiving the request signal from said scanner means, transmitter means, responsive to the received request signal, for transmitting over the communication medium to the server a request command including an interface identification code and the object code to select the information about the object itself from the multimedia service available from the server, and means for outputting the information about the object itself on the user display terminal.

2. The apparatus of claim 1, wherein said multimedia server is on the Internet.

3. The apparatus of claim 2, wherein at least one of said marks represents an Internet Universal Resource Locator (URL).

4. Apparatus for use with a multimedia server for enabling a user to control the selection of an electronic multimedia service to be provided to the user by the multimedia server over a communication medium, comprising scanner means, operable by a user, for reading marks on an object and for communicating to a user interface a request signal including an object code representing the read marks, said scanner means includes a scanner identification code in the request signal communicated to said interface and said interface for interfacing the scanner means and a user display terminal to the communication medium, including receiver means for receiving the request signal from said scanner means, transmitter means, responsive to the received request signal, for transmitting over the communication medium to the server a request command including an interface identification code and the object code to select a multimedia service available from the server, and means for enabling a received selected multimedia service from the server to be outputted to the display terminal.

5. The apparatus of claim 4 wherein said interface includes the scanner identification code in the request command transmitted to the servers.

6. The apparatus of claim 1 or 4 wherein said scanner means communicates said request signal to said interface over one or more of a group of communication links including a radio link, an infra-red link and an electrical wire connection.

7. The apparatus of claim 1 or 4 wherein said multimedia program is a broadcast television program.

8. The apparatus of claim 1 or 4 wherein said scanner means reads marks off of a paper object.

9. The apparatus of claim 1 or 4 wherein said interface provides visual display feedback to a user in response to reception of said request signal.

10. The apparatus of claim 1 or 4 wherein said interface is arranged to communicate with the server over one or more of a group of communication mediums including at least a cable, a wire-pair, an optical fiber, and a radio link.

11. The apparatus of claim 1 or 4 wherein said scanner means reads one or more of a group of marks including at least alphanumeric characters, Xerox glyphs, and bar codes.

12. The apparatus of claims 1 or 4 wherein the scanner means is a hand-held means.

13. The apparatus of claim 1 or 4 wherein said marks represent a unique object identifier code which identifies said object.

14. The apparatus of claim 1 or 4 wherein said object is a planar material.

15. The apparatus of claim 1 or 4 wherein said object is a three-dimensional object having marks placed thereon.

16. The apparatus of claim 1 or 4 wherein the electronic multimedia service includes one or more services selected from a group including at least an audio program, video program, and electronic document.

17. The apparatus of claim 1 or 4 wherein said display terminal is one of a television receiver and a multimedia computer.

18. A method for providing a multimedia service to a user, comprising the steps of establishing a bidirectional communication connection between a user terminal and a multimedia server location, said connection from said multimedia server to said user being capable of carrying a video signal, scanning marks on an object to obtain information about the object itself, storing the scanned marks, converting the stored scanned marks into a request command including a first code identifying at least one video preview and a second code identifying a user's terminal, communicating, under the control of the user, the request command to said multimedia server location over the established connection, said multimedia server location containing a plurality of video previews, selecting, at the multimedia server, the multimedia service having the information using the received request command, and transmitting a multimedia signal associated with the selected multimedia service over the connection from the multimedia server location for output at the user's terminal.

19. The method of claim 18 wherein the multimedia service is a video-previews-on-demand service.

20. The method of claim 18 wherein the multimedia service is one of a group including a prerecorded multimedia program and a live multimedia program.

21. The method of claim 18 further including the step of controlling the output of the selected multimedia service by the user's scanning of one or more of a plurality of predefined control marks.

22. A method for providing an instruction-video-program-on-demand service to a user, comprising the steps of providing a multimedia server having a plurality of video programs accessible by a user in response to a request command received from the user, establishing a communication connection between a user terminal and a multimedia server location, scanning marks on an object to obtain information about the object itself, converting the scanned marks into a request command including a first code identifying the object and a second code identifying the user's location, communicating the request command to said multimedia server location over the established connection, selecting, at the multimedia server location, one or more multimedia services having the information and associated with the identified object, selected from a group including at least a prestored instructional multimedia program, a live multimedia connection to a person, and a live multimedia connection to a computer workstation, and transmitting a multimedia signal associated with the selected multimedia service over the established connection from the multimedia server location for output at the user's terminal.

23. The method of claim 18, wherein in said establishing step said multimedia server location is accessed via the Internet using said bidirectional communication connection.

24. The method of claim 23, wherein at least one of said marks represents an Internet Universal Resource Locator (URL).

25. The method of claim 18 or 22 wherein said multimedia server is located on the Internet, and at least one of said marks represents an Internet Universal Resource Locator (URL).

* * * * *